(No Model.)

P. D. LEWIS.
INSECT TRAP.

No. 544,624. Patented Aug. 13, 1895.

Witnesses:
Chas. O. Widener.
J. Z. Culver.

Inventor.
Percy D. Lewis,
per R. F. Osgood,
Attorney.

UNITED STATES PATENT OFFICE.

PERCY D. LEWIS, OF ROCHESTER, NEW YORK.

INSECT-TRAP.

SPECIFICATION forming part of Letters Patent No. 544,624, dated August 13, 1895.

Application filed April 11, 1895. Serial No. 545,290. (No model.)

*To all whom it may concern:*

Be it known that I, PERCY D. LEWIS, of Rochester, in the county of Monroe and State of New York, have invented a certain new and useful Improvement in Insect-Traps; and I do hereby declare that the following is a full, clear, and exact description of the same, reference being had to the drawings accompanying this specification.

My improvement relates to traps for catching insects and animals of various kinds; and it consists of means whereby the insects are driven by a slowly-progressive movement into a closed receptacle.

The invention consists in the combination of parts hereinafter described and embodied in the claim.

Figure 1:
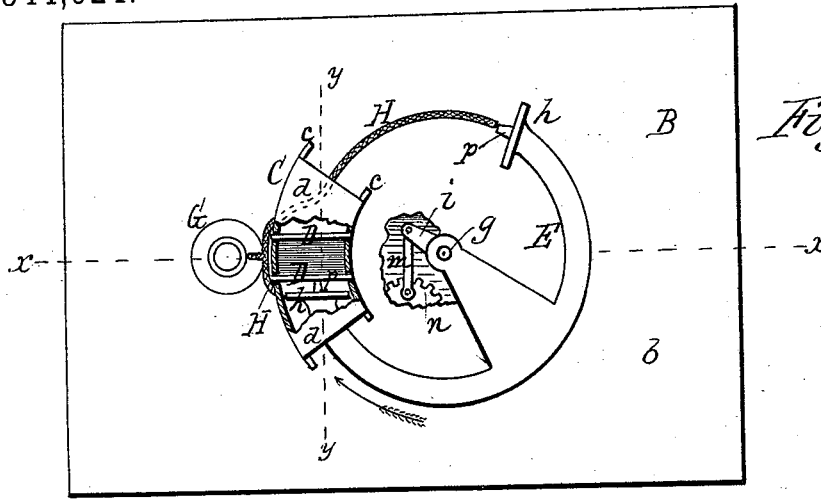
Figure 2:
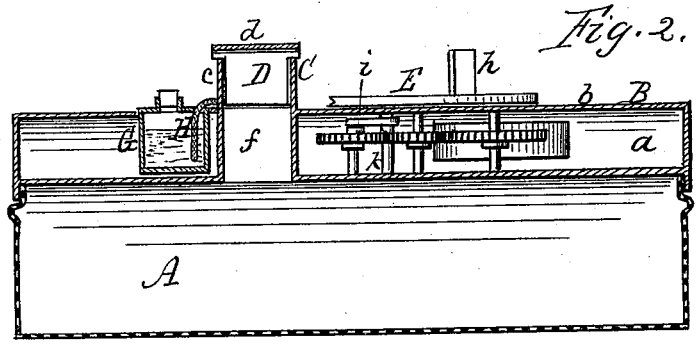
Figure 3:
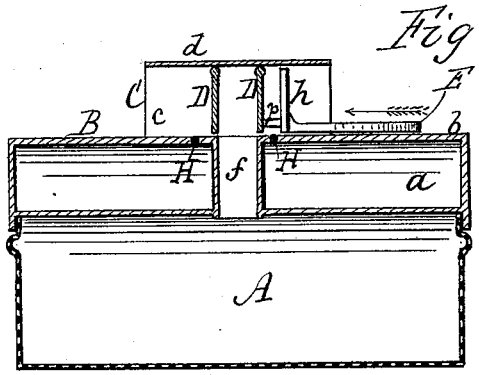
Figure 4:
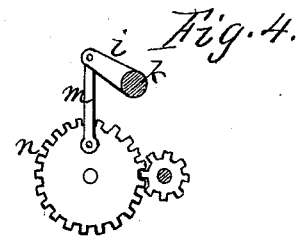

In the drawings, Figure 1 is a plan view of the apparatus. Fig. 2 is a cross-section in line $x\ x$ of Fig. 1. Fig. 3 is a cross-section in line $y\ y$ of Fig. 1. Fig. 4 is a plan view of that portion of the gearing which reciprocates the concentric slide.

A indicates the receptacle into which the insects are forced by the mechanism, the same being preferably made of wire-cloth or some other material through which light can pass.

B is a cover fitting removably over the receptacle, the same being provided with a chamber or compartment $a$, in which the actuating mechanism, such as clockwork, is located, and having a flat top $b$, containing the devices for catching the insects, as well as a surface for them to alight on. This construction may be varied as circumstances may require. The actuating mechanism may be any of the known kinds, such as an ordinary clock-movement actuated by a spring.

The catching mechanism at the top of the apparatus is constructed as follows: C is a curb, forming a segment concentric with the working mechanism, and consisting of two upright curved plates $c\ c$ open at both ends, but having a cover $d$, which is preferably transparent.

D D are two flat valves hung within the curb, swinging freely, but separated at such distance as to leave a space between them for the passage of the insects on either side into the receptacle below. This central space communicates with a chute $f$ extending down into the receptacle.

E is a concentric slide pivoted at $g$ to turn freely forward and back, and provided at its ends with heads $h\ h$, consisting of upright plates of such size as to enter the ends of the curb and nearly fill the cross area of the same. The slide is of such length that when one head has entered the curb and moved to its full extent the other has opened to such a degree as to allow insects to gather in advance of it and between it and the end of the curb. The slide receives its reciprocating motion from the gearing by any suitable means, that shown in the drawings consisting of a crank-arm $i$, attached to the shaft $k$, that holds the slide, and a rod $m$, connecting said crank-arm with a gear-wheel $n$ in direct engagement with the actuating-gearing. The full revolution of wheel $n$ gives reciprocating motion to the crank-arm and the slide.

G is a cup for holding sweetened water or other material for attracting insects, and H H are two wicks extending therefrom into the curb back of the valves, and thence extending outward in a concentric line in the pathway of the heads $h\ h$, which move over them in going forward and back. To enable this to be done the wicks are embedded flush with the top surface of the bed, but lying exposed, so as to attract insects. The cup may be dispensed with and the liquid be applied directly to the wicks. The insects attracted by the bait gather in front of the open head and are gradually driven forward by the slow movement of the head until they are forced within the closed curb, where they cannot escape. At the extent of inward movement of the head a spur $p$ thereon strikes the lower edge of the valve, swinging it inward and opening the passage beneath, and the insects attracted by the light pass downward into the receptacle. The reverse movement of the head allows the valve to fall back to place, leaving no escape. The closing of one head opens the other, so that the apparatus is double acting. If desired, it may be made single acting, one head only being used.

This invention is applicable not only to catching insects, but also small animals, in which case the creatures may be attracted by a light, either incandescent or otherwise, located at the proper point.

Having described my invention, what I claim as new, and desire to secure by Letters Patent, is—

The combination of a receptacle, a curb connected therewith, a slide provided with a head which lies in line with and enters the curb, means for operating the slide, a valve in the curb operated by the head at the extent of its inward movement, and a wick located in the line of travel of the head and leading to the curb, as and for the purpose specified.

In witness whereof I have hereunto signed my name in the presence of two subscribing witnesses.

PERCY D. LEWIS.

Witnesses:
R. F. OSGOOD,
E. C. LEE.